(12) United States Patent
Saito

(10) Patent No.: US 6,208,606 B1
(45) Date of Patent: *Mar. 27, 2001

(54) DISC REPRODUCING APPARATUS

(75) Inventor: Koji Saito, Fukaya (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/947,389

(22) Filed: Oct. 8, 1997

(30) Foreign Application Priority Data

Oct. 8, 1996 (JP) .................................................... 8-266850
Oct. 8, 1996 (JP) .................................................... 8-266852
Oct. 8, 1996 (JP) .................................................... 8-266853

(51) Int. Cl.⁷ .................................................... G11B 33/02
(52) U.S. Cl. ........................................ 369/77.1; 369/75.2
(58) Field of Search ........................... 369/37, 75.1, 75.2, 369/77.1, 77.2; 360/99.06, 99.02

(56) References Cited

U.S. PATENT DOCUMENTS

| | | | |
|---|---|---|---|
| 4,670,802 | 6/1987 | Ogawa et al. | 360/97 |
| 5,123,005 * | 6/1992 | Kurosu | 369/77.1 |
| 5,204,850 * | 4/1993 | Obata | 369/75.2 |
| 5,386,403 * | 1/1995 | Morioka et al. | 369/37 |
| 5,515,357 * | 5/1996 | Arata et al. | 369/191 |
| 5,737,304 * | 4/1998 | Soga et al. | 369/247 |
| 5,757,583 * | 5/1998 | Ogawa et al. | 360/99.07 |
| 5,768,238 * | 6/1998 | Tanaka | 369/75.2 |
| 5,844,873 * | 12/1998 | Aoyama et al. | 369/75.2 |

* cited by examiner

*Primary Examiner*—Brian E. Miller
*Assistant Examiner*—Kenneth W. Fields
(74) *Attorney, Agent, or Firm*—Pillsbury Madison & Sutro LLP

(57) ABSTRACT

An apparatus for reproducing a disc includes an operating member for manually operating an unloading tray from the body of the apparatus when the disc is clamped. The operating member is supported on a shaft and fixed to the main chassis and is thus capable of rotating around the shaft. The operating member is also provided with a protrusion for permitting a cylindrical cam to support the mechanical unit when the disc is being driven. With a supporting member of the operating member and the cylindrical cam positioned on the front side of the mechanical unit, fluctuations in disc can be reduced.

9 Claims, 14 Drawing Sheets

DISC REPRODUCING APPARATUS

BACKGROUND OF THE INVENTION

1. Field of the Invention

The invention relates to a disc reproducing apparatus for reproducing an optical disc such as a CD-ROM and a DVD.

2. Description of the Related Art

In recent years, most general disc reproducing devices, including, e.g., CD-ROM drives, integrated into personal computers, are the horizontal-front loading type. The disc reproducing apparatus is comprised of a main drive body provided with a mechanism for driving and reproducing a disc, such as an optical pickup, a disc motor, and the like (hereinafter referred to as "the mechanical unit"), and a tray mounting the disc, which is capable of being loaded into and unloaded from the driving main body through a front face thereof in a horizontal position.

The mechanical unit has, as a means for driving the disc, a motor and a turntable fixed to a driving shaft of the motor. The turntable has at its upper face a member which is to be engaged with a center hole of the disc to thereby position the disc. When the tray is loaded into the main drive body, the mechanical unit ascends in order to raise the disc from the tray by the turntable, thereby holding the disc between the turntable and a disc-like member which is called a clamp. The disc is driven and data is reproduced from it with the disc being thus held by the turntable and the clamp.

Further, the general disc reproducing device has an eject button for transmitting to a controller an electrical instructing signal for unloading the tray from the main drive body, after reproduction of data on the disc has been finished. When this eject button is operated, the controller controls the mechanical unit to be lowered by the user, thereby releasing the disc held by the turntable and the clamp, which returns the disc to the tray. Thereafter, the tray is unloaded from the main drive body.

As described above, the horizontal-front loading type disc reproducing device has a mechanism for supporting the mechanical unit and for raising and lowering the mechanical unit between a height of holding the disc between the turntable and the clamp, and a height of enabling the disc to be loaded.

The disc reproducing apparatus including the above mechanical unit raising, and lowering mechanism, generally has the problem that the mechanical unit fluctuates in the main drive body due to external vibrations. For example, the mechanical unit has a raising and lowering mechanism constructed in such a way to rotate the mechanical unit with its back side as a center, with a guide shaft disposed on its front side and guided up and down. In this type device, the mechanical unit is supported at one position of its front side by the guide shaft, which possibly causes a phenomenon in which the mechanical unit is fluctuated from side to side with the one point supported by the guide shaft as a center. Such a fluctuation of the mechanical unit can be decreased by adding a member for supporting a front side of the mechanical unit. However, such a supporting member requires a mechanism for interlocking the supporting member with the ascending and descending movement of the mechanical unit in order to prevent the mechanical unit from ascending and descending. The addition of the supporting member having such a structure, complicates assembly, and increases the cost.

Besides, the conventional horizontal-front loading type disc reproducing device controls the motor to stop when detecting the point of time when finishing clumping the disc and the point of time when finishing unloading the tray, respectively. For example, the of completion of clumping the disc can be detected due to the position of the specific member in the raising and lowering of the mechanism, or the like. In addition, completion of unloading the tray can be detected by constructing a switch in such a manner that the switch can be directly operated through a protrusion disposed on the tray, for operating the switch.

As described above, the disc reproducing device requires many switches for directly detecting the movement of various members, and their operating members. An excessive number of switches and their operating members make the whole construction complicated, and increase the cost.

Further, most horizontal-front loading type disc reproducing devices have mechanisms for loading the tray, and a mechanism for forcedly unloading the tray from the main drive body when a mechanical unit moving mechanism has become inoperable due to failure. This tray can be forcedly unloaded by the user moving a movable member for moving the mechanical unit while supporting it. As means for moving the above movable member, an emergency lever is employed, which is integrated into the drive in manufacture. The emergency lever can be rotated when pressed at its one end by a bar-like member such as a wire, which is inserted into the drive by the user. This rotates the above movable member, thereby lowering the mechanical unit to unload the tray a little from the main drive body.

However, such an emergency lever needs a strong pressing force. Thus, because of the strong pressing force, operation of the emergency lever often makes users feel uneasy, and also causes confusion when the bar inserted into the drive, begins to bond etc.

The same problems described above applies to devices for recording data on to the disc.

SUMMARY OF THE INVENTION

It is a first object of the invention to realize, by a fewer number of parts, a disc reproducing apparatus which is capable of firmly supporting a mechanical unit during driving of a disc.

It is a second object of the invention to provide a disc reproducing device with a reduced number of whole parts including switches and their operating members, for detecting the operation timings such as the point of time when finishing clumping a disc.

It is a third object of the invention to provide a disc reproducing apparatus which is superior in operability of operation members for forcedly moving, in emergency, a mechanical unit to a position of disabling a disc to be driven.

It is a fourth object of the invention to provide, by a simple construction, a disc reproducing apparatus which is capable of raising a constraint force of a tray during driving a disc.

In order to attain the above first object, according to a first aspect of the invention, there is provided a apparatus for reproducing a disc, the apparatus comprising a mechanical unit including a mechanism for driving the disc, a mechanical unit moving means for moving said mechanical unit between a first position and a second position, the first position enabling said disc to be driven, the second position disabling said disc to be driven, an operating member for operating said mechanical unit moving means by a force added from an outside so as to move said mechanical unit from said first position to said second position, and first supporting means disposed on said operating member, for supporting said mechanical unit positioned at said first position.

According to the first aspect of the invention, the operating member for forcedly moving the mechanical unit to a position of disabling the disc to be driven is added with the supporting means for supporting the mechanical unit positioned at a position of enabling the disc to be driven, thereby increasing supporting points of the mechanical unit only by adding the minimum number of the parts, which prevents the main drive body from fluctuating when it receives the vibration from the outside, or it drives the disc having an eccentric center of gravity.

In order to attain the above second object, according to a second aspect of the invention, there is provided an apparatus for reproducing a disc, the apparatus comprising, a mechanical unit including a mechanism for driving the disc, a mechanical unit moving means for moving said mechanical unit between a first position and a second position, the first position enabling said disc to be driven, the second position disabling said disc to be driven, an operating member for operating said mechanical unit moving means by a force added from an outside so as to move said mechanical unit from said first position to said second position, a detecting means for mechanically detecting that said mechanical unit has reached said first position, and operating means disposed on said operating member, for mechanically operating said detecting means when said mechanical unit has reached said first position.

According to the second aspect of the invention, the operating member for forcedly moving the mechanical unit to a position of disabling the disc to be driven is added with the operating means for mechanically operating the detecting means when the mechanical unit reaches a position of enabling the disc to be driven, thereby improving the degree of freedom of selecting the position of the detecting means to make it easy to employ a two-contact-type toggle switch. This decreases the number of whole parts including switches and their operating members, for detecting the operation timings such as the point of time when finishing clumping the disc.

In order to attain the above third object, according to a third aspect of the invention, there is provided an apparatus for reproducing a disc, the apparatus comprising, a mechanical unit including a mechanism for driving the disc, a mechanical unit moving means for moving said mechanical unit between a first position and a second position, the first position enabling said disc to be driven,the second position disabling said disc to be driven, the mechanical unit moving means including a rotating member, an operating member for operating said mechanical unit moving means by a force added from an outside so as to move said mechanical unit from said first position to said second position, the operating member having a plurality of contacting points of transmitting a power to said rotating member.

According to the third aspect of the invention, the contacting points of transmitting the power to the rotational member can be changed over according to the rotational position of the rotational member in such a manner that a distance between a position of the contacting point of actually transmitting the power to the rotational member and a center position of the rotational member becomes the minimum as a whole in the whole rotational position of the rotational member.

In order to attain the above fourth object, according to a fourth aspect of the invention provides an apparatus for reproducing a disc, the apparatus comprising, a mechanical unit including a mechanism for driving the disc, a tray transferring means for transferring a tray mounting said disc, a mechanical unit moving means for moving said mechanical unit between a first position and a second position, the first position enabling said disc to be driven, the disc being mounted on said tray which is transferring to a predetermined position by said tray transferring means, the second position disabling said disc to be driven, an operating member for operating said mechanical unit moving means by a force added from an outside so as to move said mechanical unit from said first position to said second position, and means disposed on said operating member, for locking said tray when said mechanical unit is positioned at said first position.

According to the fourth aspect of the invention, the operating member for forcedly moving the mechanical unit to a position of disabling the disc to be driven is added with the means for locking the tray during driving the disc, thereby raising the force of constraint of the tray during reproducing the disc.

Further object and advantages of the invention will be apparent from the following description of the preferred embodiment of the invention as illustrated in the accompanying drawings.

DETAILED DESCRIPTION OF THE PREFERRED EMBODIMENTS

The invention will now be described in detail with reference to the drawings showing an embodiment thereof.

This embodiment is comprised of a disc reproducing apparatus for reproducing an optical disc such as a CD-ROM (hereinafter referred to as "the disc") to which the invention is applied.

Figure 1:
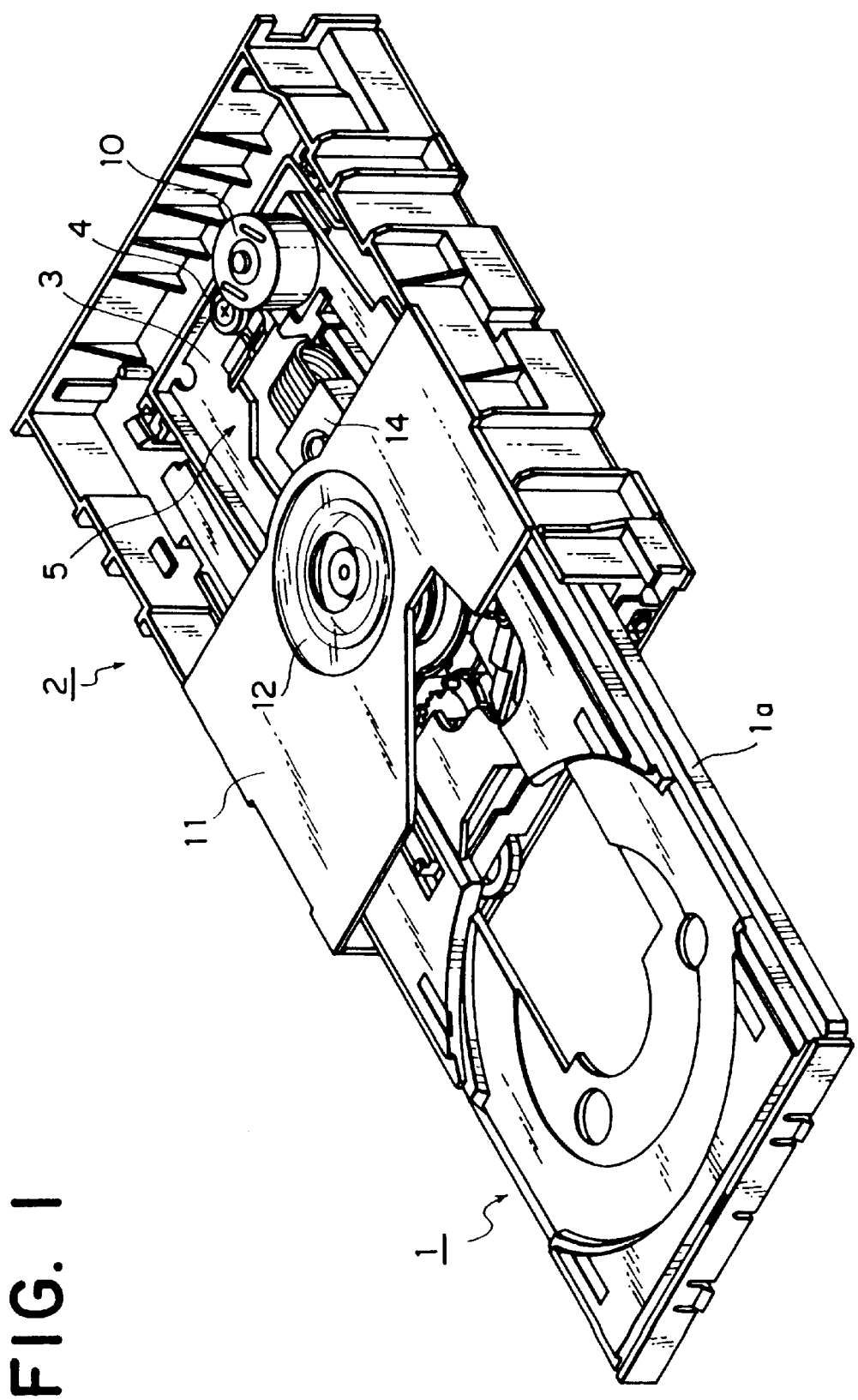
FIG. 1 is a perspective view showing a disc reproducing apparatus according to an embodiment of the invention in a state in which a tray is unloaded.
Figure 2:
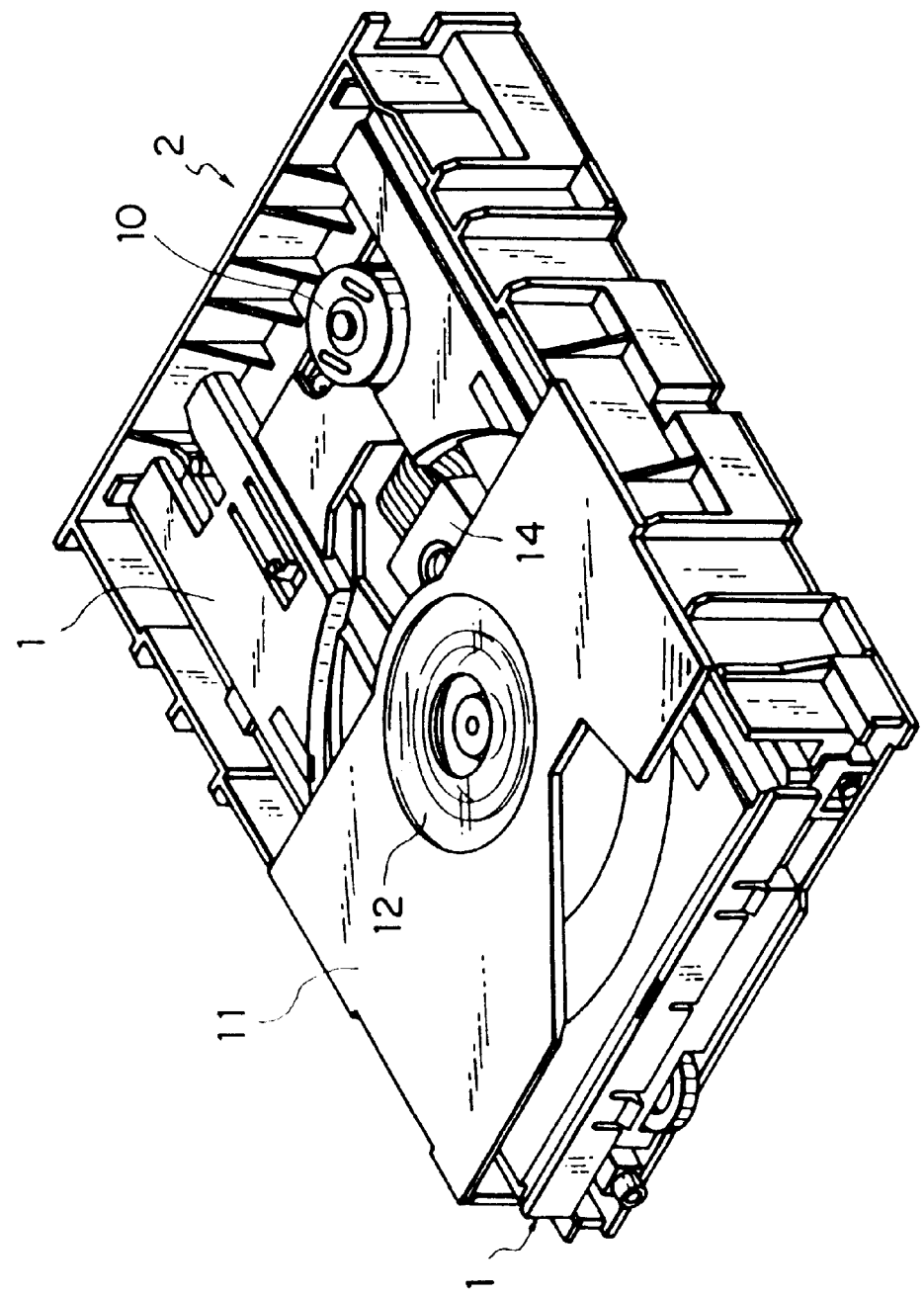
FIG. 2 is a perspective view showing a disc reproducing apparatus according to the embodiment of the invention in a state in which a disc is reproduced.

As shown in FIG. 1 and FIG. 2, the disc reproducing apparatus has a tray 1 for mounting a disc (not shown), a main chassis 2 as a main drive body, and a cabinet (not shown) for integrally containing the tray 1 and the main chassis 2. The tray 1 has, at both ends, protrusions 1a which are to be supported at the main chassis 2. The main chassis 2 has means (not shown) for supporting the protrusions 1a disposed on both ends of the tray 1 and for guiding the tray 1, thereby moving the tray 1 between such a position (Refer to FIG. 1) of unloading the tray 1 from the main chassis 2 so as to enable the disc to be exchanged, and such a position of loading the tray 1 into the main chassis 2 so as to enable the disc to be reproduced (Refer to FIG. 2).

As shown in FIG. 1, FIG. 2, FIG. 3 and FIG. 4, the main chassis (main drive body) 2 has a mechanical unit 5 which mounts a mechanism for driving and reproducing the disc, such as a disc motor 13, an optical pickup 14 and an optical pickup feeding mechanism (pickup feeding motor 10, or the like). The above mechanism is mounted on a chassis 3 which is supported on a base body of the mechanical unit 5 through a plurality of cushion members 4 comprised of rubber dampers, or the like. The disc motor 13 has a turntable 16 fixed to a leading end portion of a shaft of the motor. A clamp 12 for holding the disc in association with the turntable 16 is rotatably held by a clamp holder 11 attached to the main chassis 2. The turntable 16 and the clamp 12 are connected to each other by a magnetic force of a magnet fitted to at least one of them.

Figure 5:
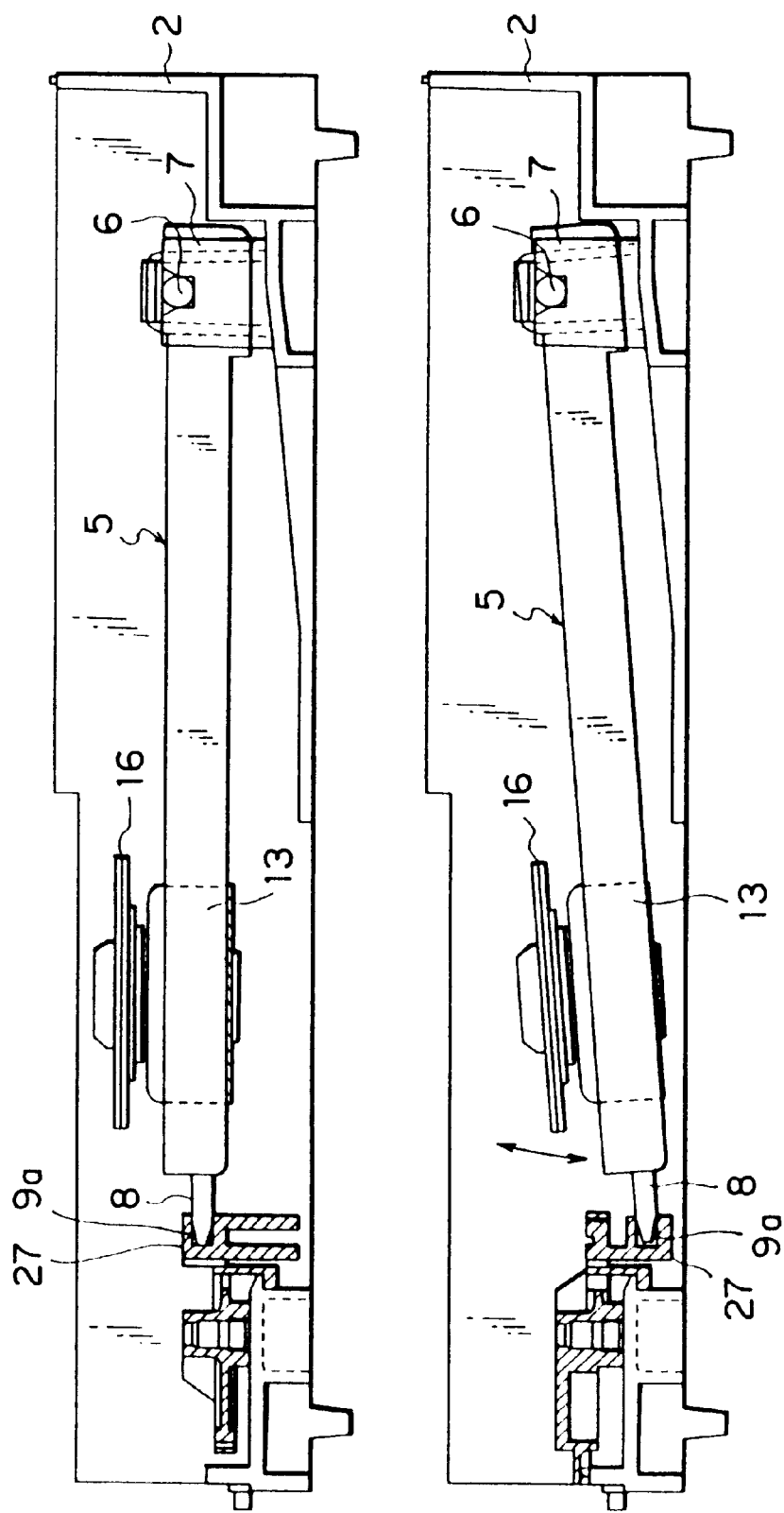
FIG. 5 is a side sectional view of the raising and lowering mechanism of a mechanical unit.

As shown in FIG. 5, the mechanical unit 5 has two rotational shafts 6 and one raising and lowering guide shaft 8, which connect the mechanical unit 5 to the main chassis 2. The two rotational shafts 6 are supported, respectively, on two bearing portions 7 disposed on the main chassis 2. The raising and lowering guide shaft 8 is disposed on a front side (face in a tray unloading side) of the base body of the mechanical unit 5, and is inserted in or held on a guide groove 9a disposed on a circumferential face of a cylindrical cam 27 as one part of a mechanism for raising and lowering the mechanical unit 5. In addition, the raising and lowering guide shaft 8 is guided up and down along the guide groove 9a disposed on the circumferential face of the cylindrical cam 27 with the rotation of the cylindrical cam 27. According to the above-mentioned construction, the rotation of the cylindrical cam 27 enables the mechanical unit 5 to be rotated within a predetermined angular range around the rotational shafts 6.

Figure 3:
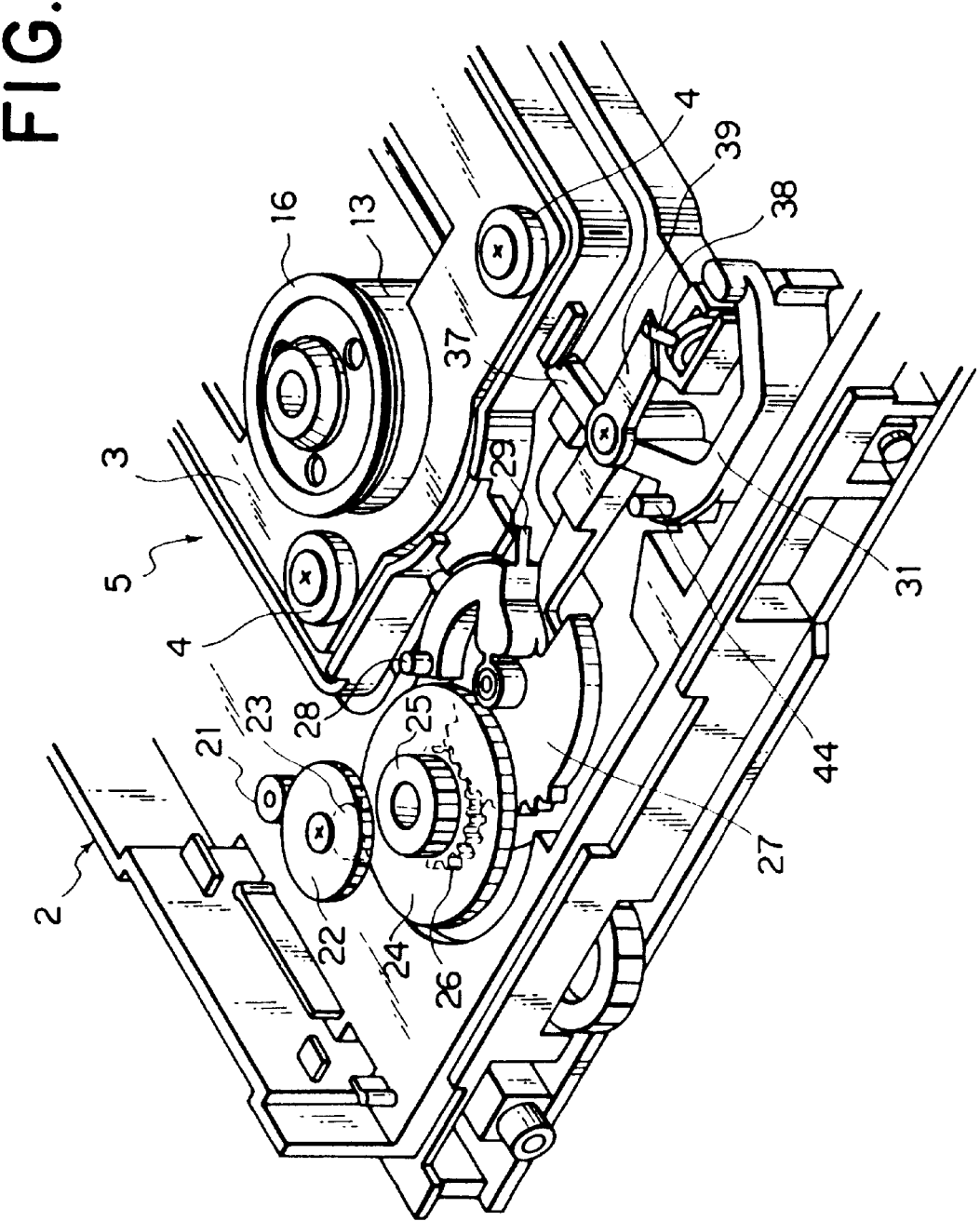
FIG. 3 is a perspective view showing a tray loading mechanism in a state in which the disc is clamped.
Figure 4:
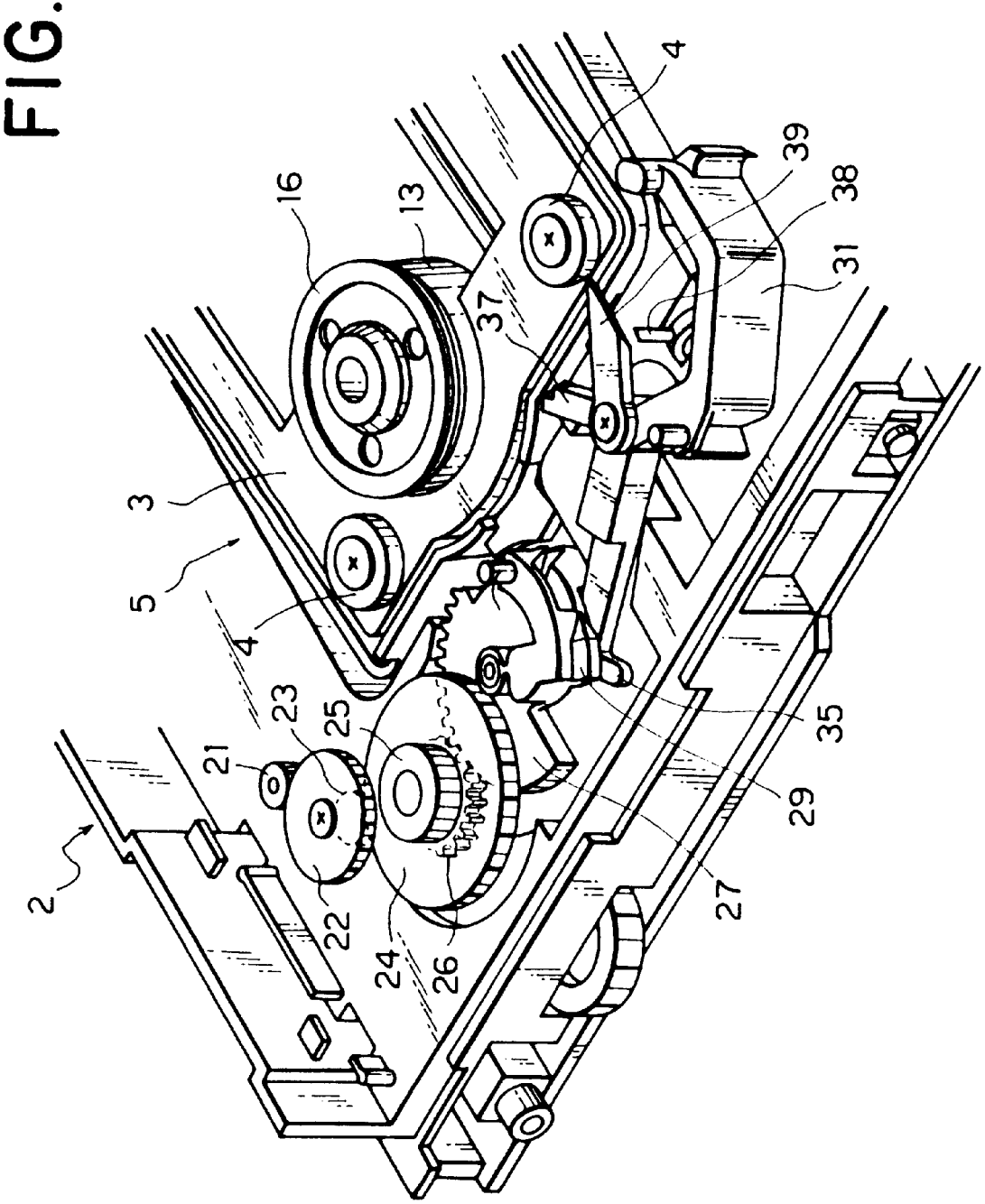
FIG. 4 is a perspective view showing the tray loading mechanism in a state in which the disc is unclamped.
Figure 6:
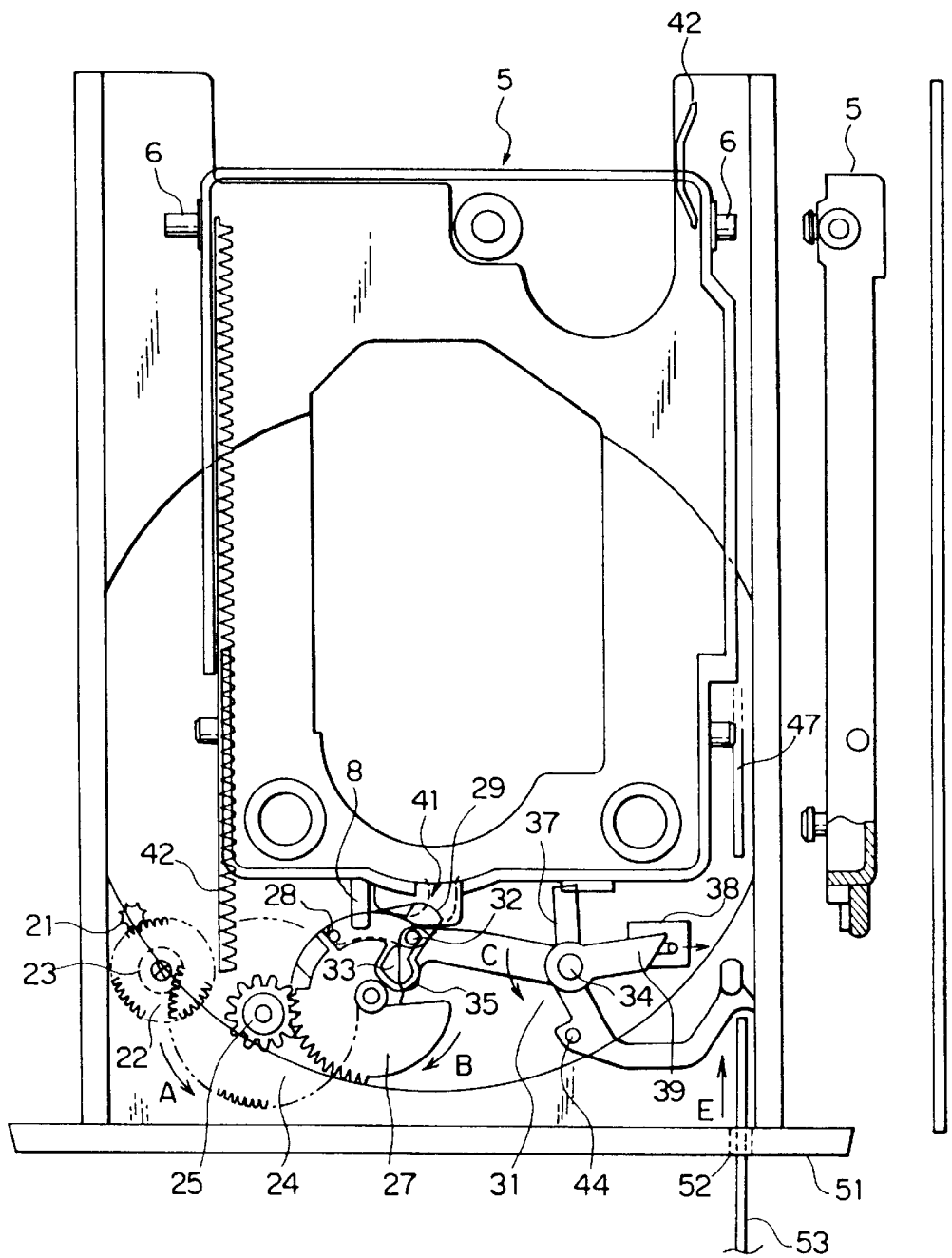
FIG. 6 is a plan view showing the disc reproducing apparatus in a state in which the disc is reproduced.

As shown in FIG. 3 and FIG. 4, a driving shaft of a loading motor (not shown), which is a power source for feeding the tray 1, and raising and lowering the mechanical unit 5, is connected to an intermediate gear 22 through a pinion gear 21. A pinion gear 23 coaxially fixed to the intermediate gear 22 is connected to a loading gear 24. As shown in FIG. 6, an upper pinion gear 25 coaxially fixed to the loading gear 24 is connected to a rack gear 42 disposed on the tray 1. Further, a lower pinion gear 26 coaxially fixed to the loading gear 24 is connected to a gear disposed on a cylindrical cam 27.

The cylindrical cam 27 has a pin-like protrusion 28 which is engaged with a cam 41 protrudingly disposed on a rear face of the tray 1. Further, the cylindrical cam 27 has a bearing protrusion 29 for bearing a collar portion 5a disposed on a front side of the mechanical unit 5 when the turntable 16 and the clamp 12 hold the disk, and a cam groove 33 for holding and guiding a first protrusion 32 disposed on one end of an emergency lever 31.

The emergency lever 31 is supported on a shaft 34 fixed to the main chassis 2 at its one end and is capable of rotating around the shaft 34. The emergency lever 31 is provided with the first protrusion 32 and a second protrusion 35 as a connecting means for the cylindrical cam 27. A detailed connection relation between the first and the second protrusions 32, 35 and the cylindrical cam 27 will be described later.

Further, the emergency lever 31 has a bearing protrusion 37 for bearing a collar portion 5b disposed on a front face side of the mechanical unit 5 when the turntable 16 and the clamp 12 hold the disc (hereinafter referred to as "when clumping the disc"), and a switch operating portion 39 for tilting, when the turntable 16 and the clamp 12 have finished holding the disc (hereinafter referred to as "the point of time when finishing clumping the disc"), a toggle switch 38 having two contacts in a predetermined side from a neutral state (state in which none of the contacts is turned on) to turn on one of the contacts.

Figure 13:
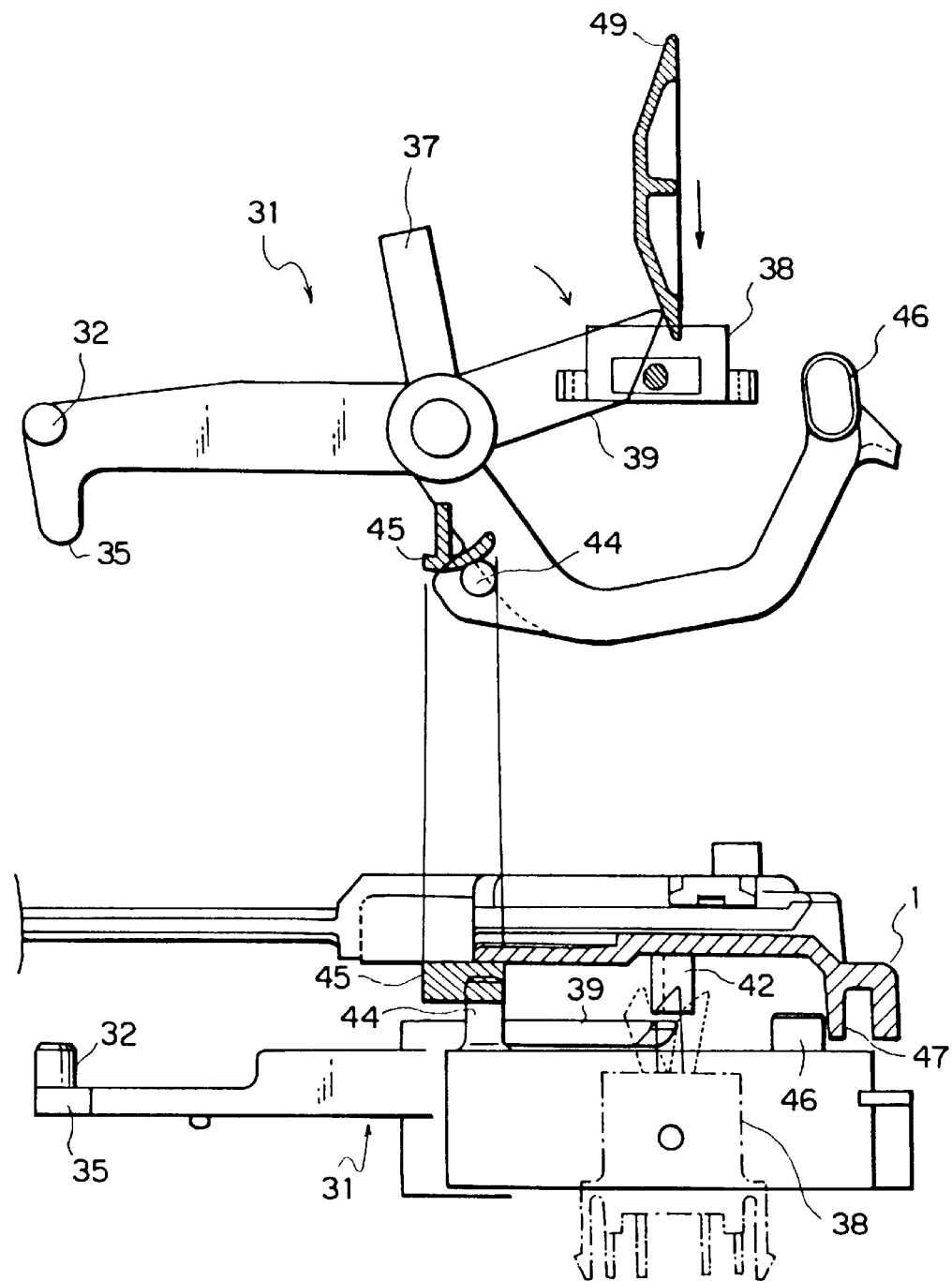
FIG. 13 is a plan view and a side view, respectively, showing a relation among an emergency lever switch operating protrusions of a tray, and switches.

The switch 38 is employed for detecting the point of time when finishing clumping the disc, and the point of time when finishing unloading the tray. That is, as shown in FIG. 13, the switch 38 is pushed by the switch operating portion 39 of the emergency lever 31 to be tilted in a right side in FIG. 13 when finishing clumping the disc, and is pushed by the switch operating protrusion 49 disposed on a rear face of the tray 1 to be tilted in a left side in FIG. 13 when finishing unloading the tray.

Next, an operation of unloading the tray in the above disc reproducing apparatus will be described hereinbelow.

FIG. 3 and FIG. 6 each shows a state in which the disc is reproduced, that is, clamped. In that instance, the switch 38 is tilted to the right side by the switch operating portion 39 of the emergency lever 31.

Further, when clumping the disc, the respective collar portions 5a, 5b of the mechanical unit 5 are born at two positions away from each other in its lateral direction with respect to a center of the mechanical unit 5 by the supporting protrusion 29 of the cylindrical cam 27 and the supporting protrusion 37 of the emergency lever 31, thereby stably supporting the mechanical unit 5 on the main chassis 2, which prevents the mechanical unit 5 from fluctuating in the lateral direction, e.g. when receiving the vibration from the outside, or when driving the disc at high speed.

Besides, as shown in FIG. 3, when clumping the disc, the gear of the cylindrical cam 27 is engaged with the lower pinion gear 26 of the loading gear 24, but the upper pinion gear 25 of the loading gear 24 is disengaged with the rack gear 42 of the tray 1.

Further, as shown in FIG. 13, when clumping the disc, a protrusion 44 disposed on the emergency lever 31 is fitted in a rib 45 disposed on the rear face of the tray 1, thereby regulating the movement of the tray 1 along a face of the disc. This prevents the disc held by the turntable 16 and the clamp 12 from becoming offset from the tray 1.

When the loading motor is turned on to thereby start the loading gear 24 rotating in-an arrow A direction shown in FIG. 6, the cylindrical cam 27 is rotated in an arrow B direction, thereby turning, in an arrow C direction, the emergency lever 31 which is connected to the guide groove 33 of the cylindrical cam 27 through the pin protrusion 32. The subsequent state of the apparatus is shown in FIG. 7.

Figure 7:
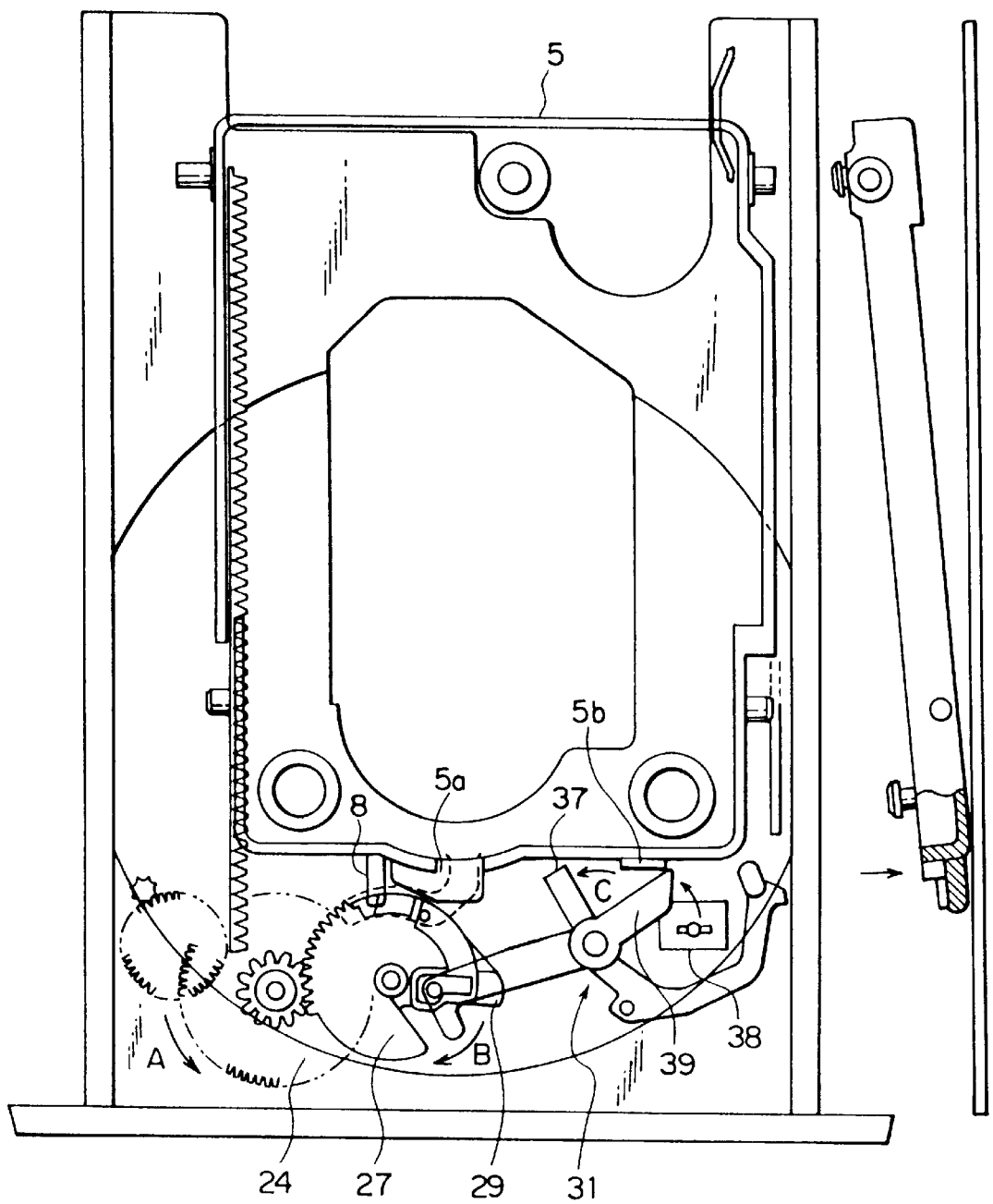
FIG. 7, FIG. 8, FIG. 8A, FIG. 9, FIG. 9A, FIG. 9B, FIG. 10, FIG. 10A and FIG. 11 are plan views showing manners of the disc reproducing apparatus according to the embodiment of the invention changing in state from a state in which the disc is reproduced, shown in FIG. 6, to a state in which the tray is unloaded, shown in FIG. 12.

As shown in FIG. 7, the turning of the emergency lever 31 separates the switch operating portion 39 of the emergency lever 31 from the switch 38, and further causes the supporting protrusion 37 of the emergency lever 31 to turn aside from a position of supporting the collar portion 5b on a front side of the mechanical unit 5, and simultaneously causes the bearing protrusion 29 of the cylindrical cam 27 to turn aside from a position of the collar portion 5a in the front side of the mechanical unit 5.

The rotation of the cylindrical cam 27 in the arrow B direction guides the raising and lowering guide shaft 8 downward along the guide groove 9a of the cylindrical cam 27, thereby releasing the connection between the turntable 16 and the clamp 12 to dissolve a state in which the disc is clamped. On this occasion, the rotational angle of the cylindrical cam 27 is 60 degrees. FIG. 7 shows the above-mentioned state.

Figures 8, 8A:
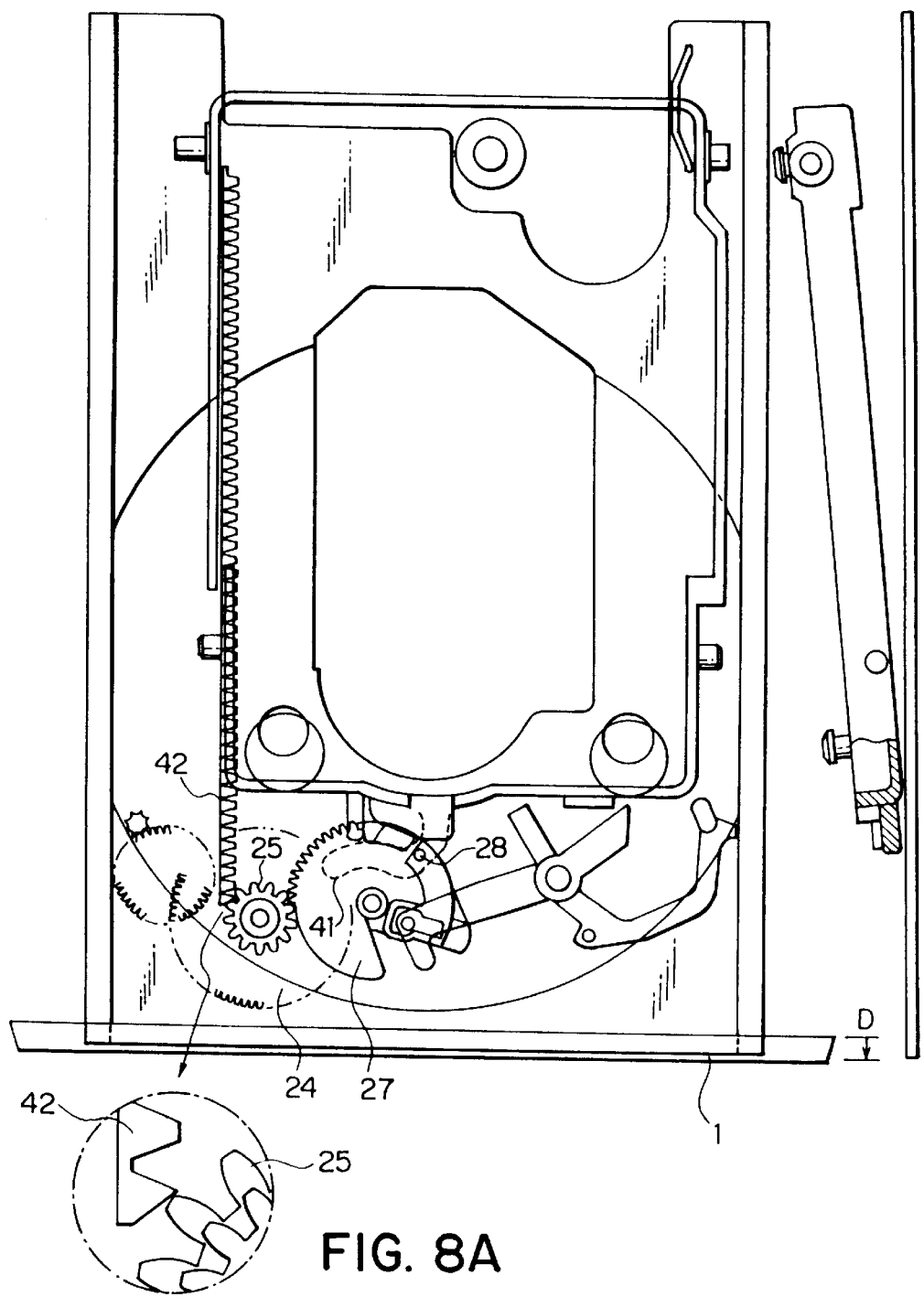
Figures 9, 9A, 9B:
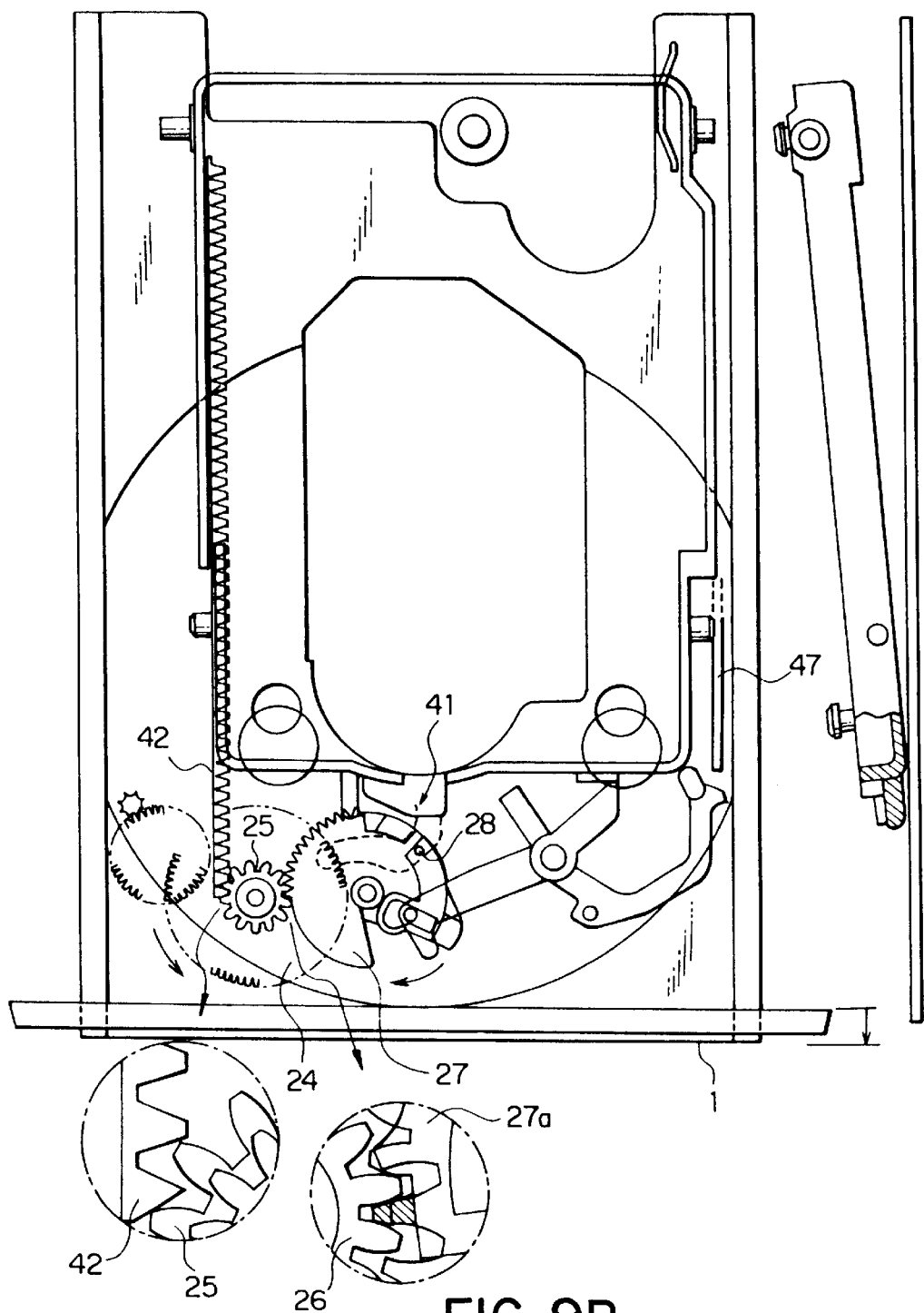

Further, as shown in FIG. 8 and FIG. 8A, the rotation of the cylindrical cam 27 in the arrow B direction starts the tray 1 moving in an arrow D direction, due to the operation of the pin protrusion 28 protrudingly disposed on an upper face of the cylindrical cam 27 and a cam 41 disposed on the rear face of the tray 1. As shown in FIG. 9, FIG. 9A, and FIG. 9B, the rotation of the cylindrical cam 27 by 85 degrees enables the upper pinion gear 25 of the loading gear 24 to be engaged with the rack gear 42 of the tray 1. On this occasion, the gear 27a of the cylindrical cam 27 is engaged with the lower pinion gear 26 of the loading gear 24.

Figures 10, 10A:
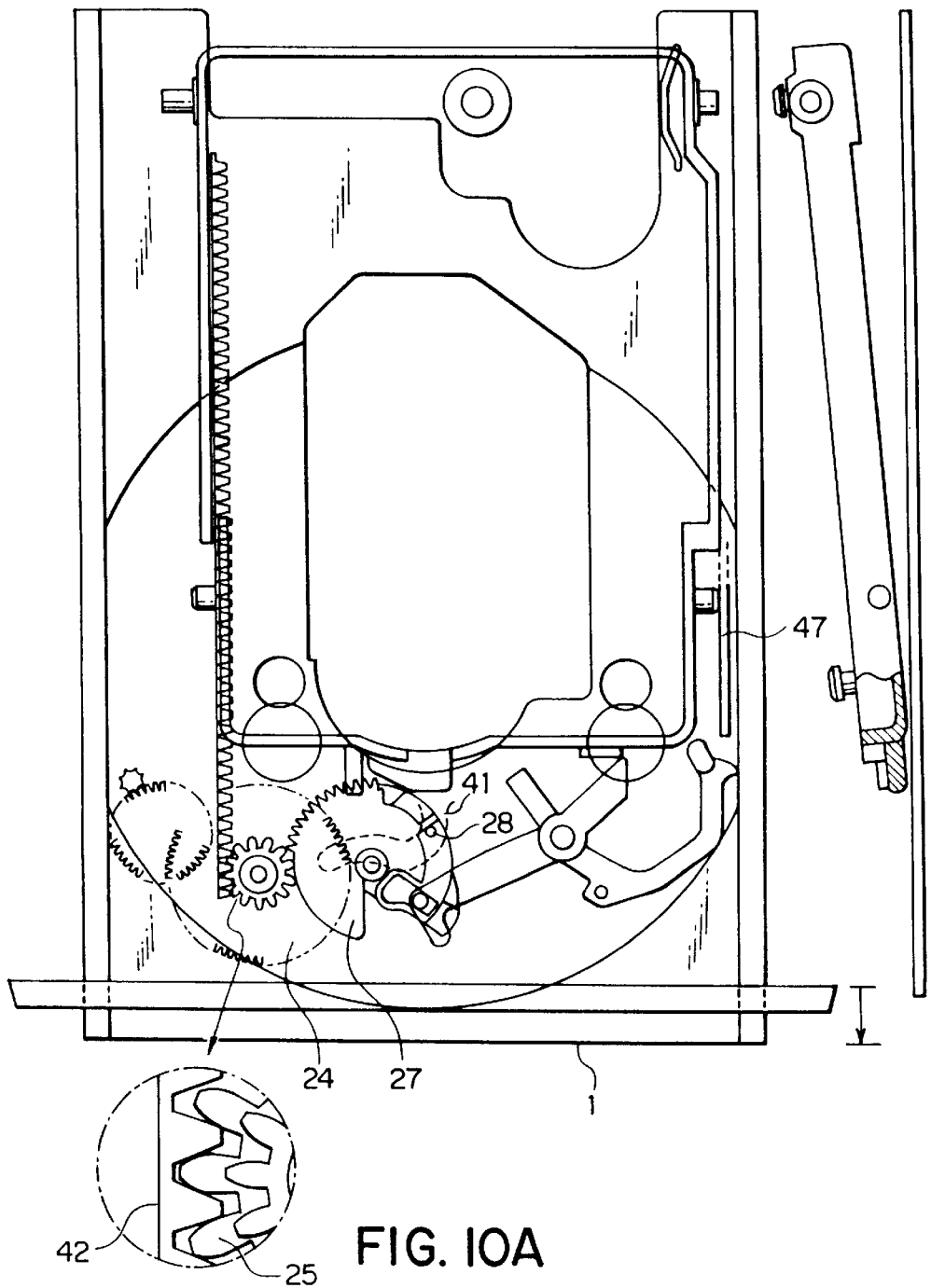

FIG. 10 and FIG. 10A show a state in which the cylindrical cam 27 is further rotated up to 95 degrees. On this occasion, the gear 27a of the cylindrical cam 27 is disengaged with the lower pinion gear 26 of the loading gear 24, and the rotation of the cylindrical cam 27 is regulated due to the operation of the pin protrusion 28 of the cylindrical cam 27 and the cam 41 of the tray 1. On the other hand, the tray 1 is advanced by the drive of the loading gear 24.

Figure 11:
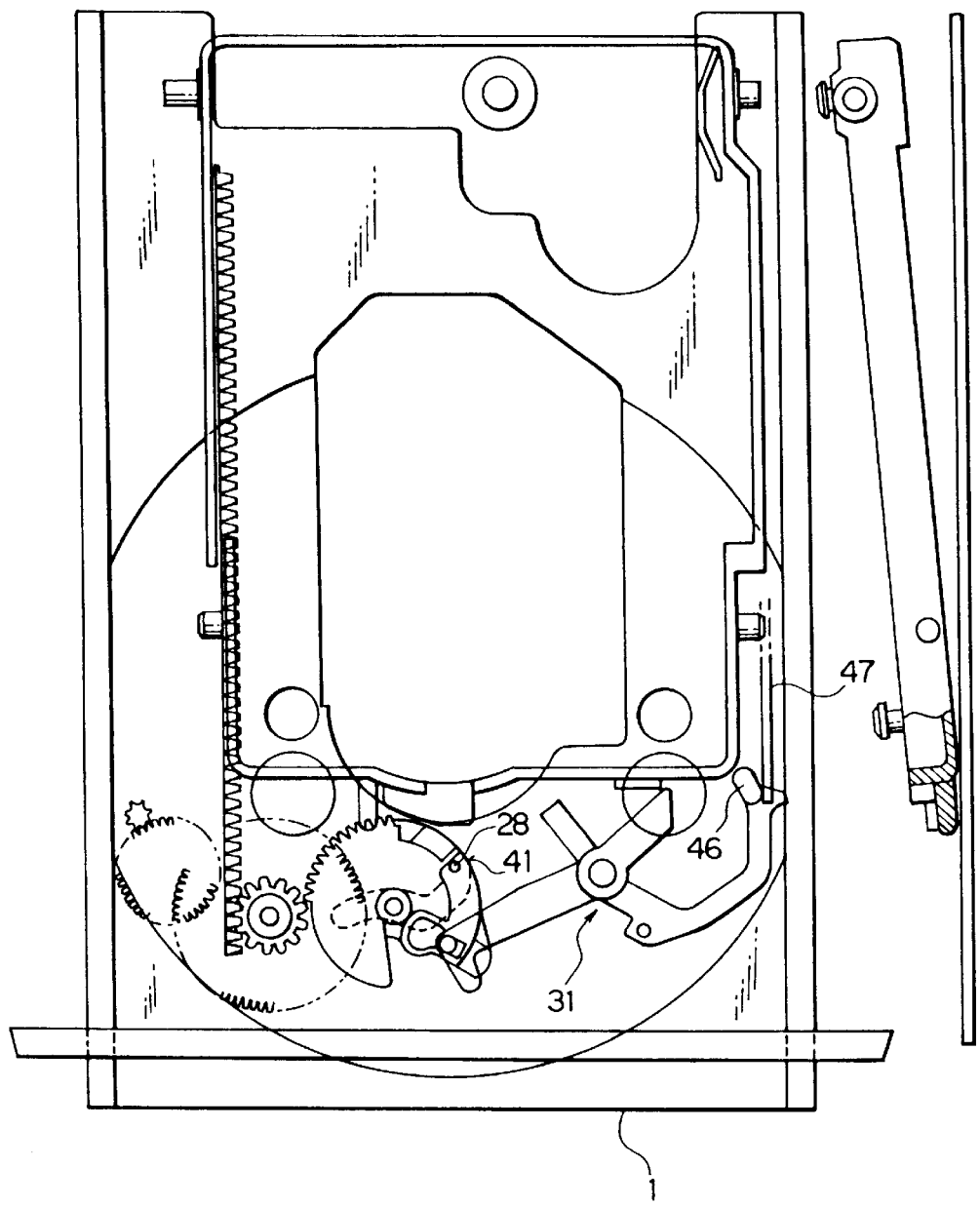

Thereafter, as shown in FIG. 11, the pin protrusion 28 of the cylindrical cam 27 is separated from the cam 41 of the tray 1. Simultaneously, as shown in FIG. 13, one end portion (rotation regulating portion) 46 of the emergency lever 31 contacts a wall 47 of a loading slide groove disposed on the tray 1, thereby regulating the turning of the emergency lever 31, that is, locking the emergency lever 31.

Figure 12:
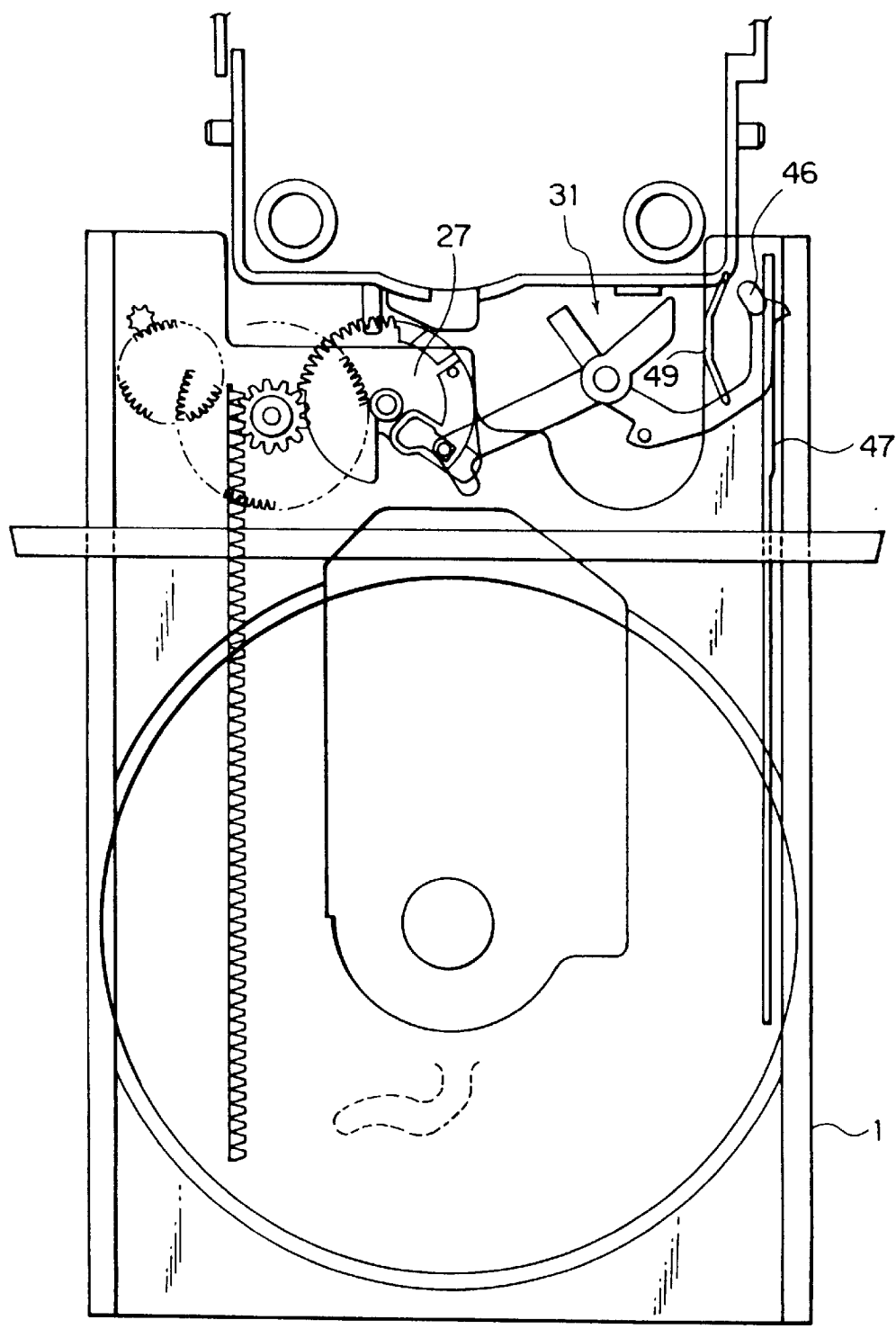
FIG. 12 is a plan view showing the disc reproducing apparatus in a state in which the tray is unloaded.

FIG. 12 shows a state in which the tray 1 is finished being unloaded. As described above, even when finishing unloading the tray 1, the one end portion 46 of the emergency lever 31 contacts the wall 47 of the slide groove of the tray 1. This prevents the emergency lever 31 from turning, and the cylindrical cam 27 from rotating due to the vibration from the outside, or the like, with no troubles.

Further, as shown in FIG. 13, when finishing unloading the tray 1, the switch operating protrusion 49 disposed on the rear face of the tray 1 enables the switch 38 to be tilted to the left side. Then, the switch 38 outputs to the controller a signal of detecting that the tray 1 is finished being unloaded, whereby the controller, which receives the detected signal, stops the motor.

Besides, as shown in FIG. 6, in a case where the loading mechanism of the tray 1 and the raising and lowering mechanism of the mechanical unit 4 becomes inoperable due to failure, black-out, or the like, a bar 53 such as a wire is inserted through a small hole 52 disposed on a front panel 51, to thereby push the end portion of the emergency lever 31 in an arrow E direction. This rotates the emergency lever 31 in the arrow C direction to rotate the cylindrical cam 27 in the arrow B direction and then lower the mechanical unit 5. According to the above operation, the tray 1 is unloaded up to a position at which it can be taken out by hand.

As described above, the switch operating portion 39, which is disposed on the emergency lever 31, for pushing the switch 38 when finishing clumping the disc, contributes to improve the degree of freedom of selecting the position of the switch 38. This makes it possible to select two points of time when finishing clumping the disc and when finishing unloading the tray 1 by using the two-contact-type toggle switch 38, without adding an additional switch operating member, thereby reducing the number of the parts and the complexity of assembly.

Next, the connection portion of the emergency lever 31 and the cylindrical cam 27 will be described in detail with reference to FIG. 14A, FIG. 14B, and FIG. 14C.

Figure 14A:
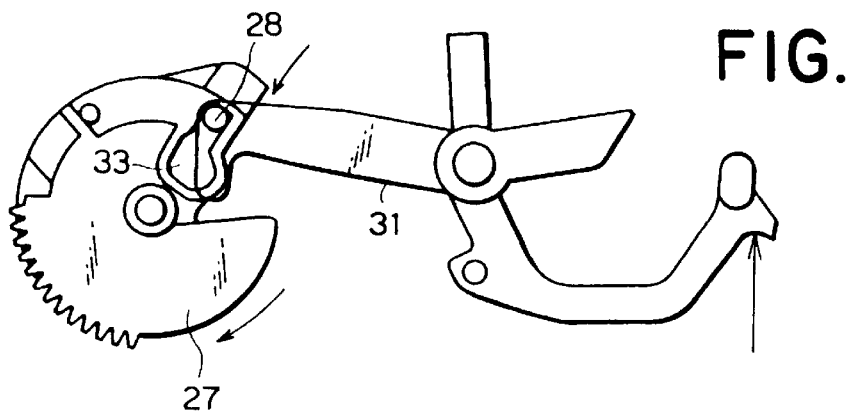
FIG. 14A, FIG. 14B, FIG. 14C, and FIG. 14D are explanatory detailed views each showing a connecting portion between the emergency lever and a cylindrical cam.

FIG. 14A shows a state in which the disc is reproduced (when clumping the disc). On this occasion, the pin protrusion 28 of the emergency lever 31 is positioned at an outer circumferential side leading end of the cylindrical cam 27 within the guide groove 33 of the cylindrical cam 27. When the emergency lever 31 is manually rotated by using the bar-like member as described above, the pin protrusion 28 pushes the wall of the guide groove 33 at its periphery portion while moving toward a center of the cylindrical cam 27 along the guide groove 33. As a result, the cylindrical cam 27 is rotated in the arrow direction.

Figure 14B:
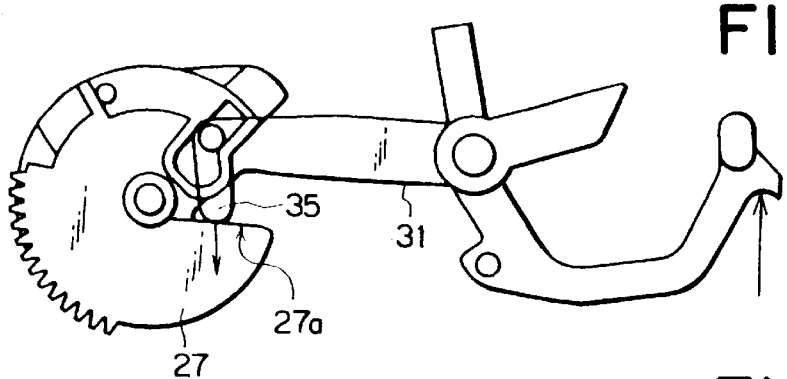
Figure 14C:
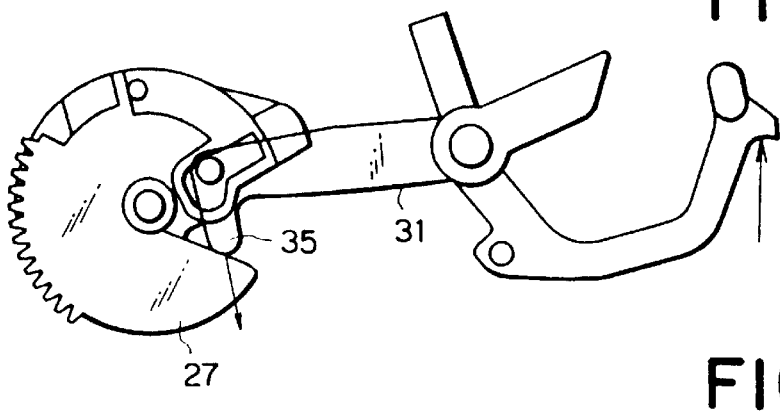
Figure 14D:
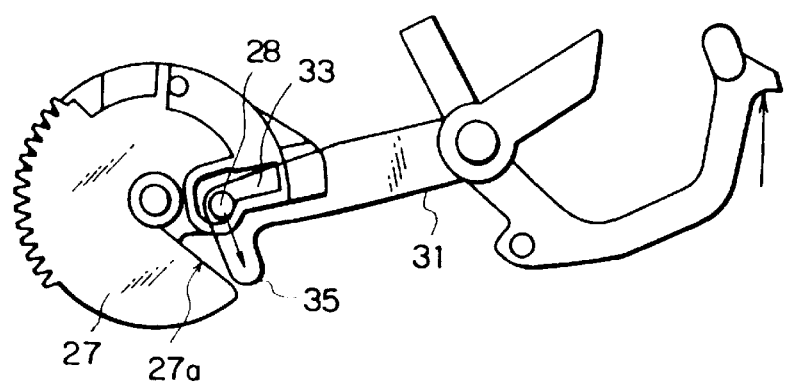

As shown in FIG. 14B, when the cylindrical cam 27 is rotated up to a predetermined angle, the pin protrusion 28 moves to a wide width portion of the guide groove 33 to thereby be separated from the wall of the guide groove 33. Simultaneously, a horizontal protrusion 35 of the emergency lever 31 contacts a protrusion receiving face 27i aof the cylindrical cam 27 to thereby rotate the cylindrical cam 27 by pushing the protrusion receiving face 27a while moving along from a center side to an outer circumferential side of the cylindrical cam 27. Thereafter, as shown in FIG. 14C, the horizontal protrusion 35 pushes the protrusion receiving face 27a while moving along the protrusion receiving face 27a toward the outer periphery side of the cylindrical cam 27.

The above-mentioned construction makes it possible to rotate the cylindrical cam 27 by a small force, as a whole, compared with a case in which the cylindrical cam 27 is rotated by pushing the wall of the guide groove 33 of the cylindrical cam 27 by the pin protrusion 28 only.

When the emergency lever 31 is further rotated, the horizontal protrusion 35 of the emergency lever 31 is separated from the protrusion receiving face 27a of the cylindrical cam 27 and thereby the pin protrusion 28 contacts the wall of the guide groove 33 again. On this occasion, the pin protrusion 28 pushes the wall of the guide groove 33 from the center side of the cylindrical cam 27 toward the outer circumferential side, thereby rotating the cylindrical cam 27 by a relative small force also.

As described above, the embodiment in which the disc reproducing device for reproducing the CD-ROM is applied with the invention is described. An apparatus of any other system (e.g. a DVD reproducing apparatus) can be applied with the invention insofar as the apparatus includes a mechanism for driving an optical disc. For example, the invention can be applied to not only an optical disc data reproducing device, but also to a disc apparatus which is capable of recording data on the optical disc.

Many widely different embodiments of the invention may be constructed without departing from the spirit and scope of the invention. It should be understood that the invention is not limited to the specific embodiments described in the specification, except as defined in the appended claims.

What is claimed is:

1. An apparatus for reproducing a disc, the apparatus comprising:

a mechanical unit including a mechanism for driving the disc;

a cylindrical cam having a guide groove adapted for supporting said mechanical unit, the guide groove guiding said mechanical unit in order to move said mechanical unit between a first position and a second position, the first position enabling said disc to be driven, the second position disabling said disc from being driven; and an operating member adapted to cooperatively move with said cylindrical cam, said operating member permitting a user to manually move said cylindrical cam in order to move said mechanical unit from said first position to said second position when said mechanical unit is inoperable, the operating member having a supporting portion for supporting said mechanical unit positioned at said first position when said mechanical unit is positioned at said first position.

2. The apparatus as set forth in claim 1, further comprising a tray mounting said disc, and said second position is a position for allowing the tray to be transferred.

3. The apparatus as set forth in claim 1, wherein said mechanical unit moving means is adapted to rotate said mechanical unit with an end of the mechanical unit as a supporting point.

4. The apparatus as set forth in claim 1, further comprising means for regulating the movement of said operating member when said mechanical unit is positioned at said first position.

5. The apparatus as set forth in claim 1, further comprising:

detecting means for mechanically detecting that said mechanical unit has reached said first position; and operating means disposed on said operating member, for mechanically operating said detecting means when said mechanical unit has reached said first position.

6. An apparatus for reproducing a disc, the apparatus comprising:

a mechanical unit including a mechanism for driving the disc;

a cylindrical cam having a guide groove adapted for supporting said mechanical unit, the guide groove guiding said mechanical unit in order to move said mechanical unit between a first position and a second position, the first position enabling said disc to be driven, the second position disabling said disc from being driven; and an operating member adapted to cooperatively move with said cylindrical cam, said operating member permitting a user to manually move said cylindrical cam in order to move said mechanical unit from said first position to said second position when said mechanical unit is inoperable, the operating member having a first contacting portion and a second contacting portion, each of the first and second contacting portions being configured to transfer power to said cylindrical cam;

wherein all contacting portions simultaneously contact the cylindrical cam when transferring the power, the simultaneous contact thereby optimizing an operating load applied to said operating member.

7. The apparatus as set forth in claim 6, further comprising a tray mounting said disc, and said second position is a position for allowing the tray to be transferred.

8. The apparatus as set in claim 6, wherein said cylindrical cam is adapted to rotate said mechanical unit with an end of the mechanical unit as a supporting point.

9. The apparatus as set forth in claim 6, further comprising means for regulating the movement of said operating member when said mechanical unit is positioned at said first position.

* * * * *

UNITED STATES PATENT AND TRADEMARK OFFICE
CERTIFICATE OF CORRECTION

PATENT NO.   : 6,208,606 B2  Page 1 of 1
DATED        : March 27, 2002
INVENTOR(S)  : Saito It is certified that error appears in the above-identified patent and that said Letters Patent is hereby corrected as shown below:

<u>Column 2,</u>
Line 28, delete "a little".
Line 32, delete "also".
Line 44, delete "whole".

<u>Column 5,</u>
Line 9, delete "such".

Signed and Sealed this

Fourth Day of February, 2003

JAMES E. ROGAN
*Director of the United States Patent and Trademark Office*